United States Patent [19]

Nguyen et al.

[11] Patent Number: 5,513,672

[45] Date of Patent: May 7, 1996

[54] VALVE ASSEMBLY

[75] Inventors: Van Doan Nguyen, Frankfurt; Yuejin Gong, Bad Homburg; Randolf Körtge; Hans-Jürgen Lauth, both of Usingen; Gerhard Overdiek, Friedrichsdorf; Willi Parsch, Bickenbach; Thomas Nied-Menninger, Usingen, all of Germany

[73] Assignee: LUK Fahrzeug-Hydraulik GmbH & Co. KG, Bad Homburg, Germany

[21] Appl. No.: 250,399

[22] Filed: May 27, 1994

[30] Foreign Application Priority Data

May 28, 1993 [DE] Germany .............. 43 17 785.9
Oct. 16, 1993 [DE] Germany .............. 43 35 377.0

[51] Int. Cl.$^6$ .................................................. G05D 7/01
[52] U.S. Cl. .................................. 137/117; 137/503
[58] Field of Search ............................. 137/117, 503

[56] References Cited

U.S. PATENT DOCUMENTS

| | | | |
|---|---|---|---|
| 3,314,495 | 4/1967 | Clark | 137/117 X |
| 4,311,161 | 1/1982 | Narumi | 137/117 |
| 4,361,166 | 11/1982 | Honaga | 137/117 |
| 5,038,822 | 8/1991 | Iwata | 137/117 X |

Primary Examiner—Robert G. Nilson
Attorney, Agent, or Firm—Anderson Kill Olick & Oshinsky

[57] ABSTRACT

A valve assembly for controlling volume flow from a discharge device to an actuator and including a discharge throttle, and a flow control valve for controlling flow through the throttle and having a piston, and end portion of which overlaps a channel for returning excess fluid to a suction side of the discharge device and has an end region forming a seated valve preventing leakage past the end region, when the end region completely overlaps the return channel.

21 Claims, 8 Drawing Sheets

VALVE ASSEMBLY

BACKGROUND OF THE INVENTION

The invention relates to a valve assembly comprising a flow control valve having a piston displaceable in a bore against a biasing force of a spring, and a discharge throttle.

It is known to use a valve assembly, which comprises a flow control valve, in e.g., a steering pump of a motor vehicle for providing a uniform oil flow to an actuator connected with the steering pump. Controlling the oil flow to the actuator is especially important during a rapid drive on a highway, when the requirement in power assist is insignificant and, therefore, the power assist requires small amount of oil, but when, in case of a suddenly flattened tire, a large amount of oil need be delivered to the actuator to insure an adequate steering. Accordingly, it was suggested to use so-called main or discharge throttles for controlling the oil flow. The discharge throttle is provided in the working conduit leading to the actuator and should insure a constant oil flow to the actuator. The discharge throttle is used together with a slide valve for providing a predetermined oil flow. The drawback of this arrangement consist in that the slide valve should have a predetermined minimal play for enabling its displacement. However, this minimal play leads to leakage losses and, thus, reduces the hydraulic efficiency of the pump. These leakage losses are especially noticeable during idle running of the pump when the pump supplies a small amount of oil.

Accordingly, the main object of the invention is a valve assembly of the above-discussed type which would insure an easy flow control, while substantially reducing leakage losses.

SUMMARY OF THE INVENTION

This and other objects of the invention, which will become apparent hereinafter, are achieved by providing a valve assembly in which the discharge throttle is located in the axial inner space of the flow control valve and cooperates with the valve piston, which, on one side, comprises an end region which overlaps a channel leading from the inner space of the valve assembly to a suction side of the discharge device, and on the other side, forms a seated valve for sealing the channel. Such a combination of a discharge throttle and the valve piston permits to reduce the leakage losses of the fluid, which flows through the throttle to the actuator, because the seated valve prevents fluid flow past the piston in a closed position of the seated valve.

In the valve assembly according to the present invention, the valve piston sealingly closes the return channel to the suction region of the pump when the fluid flow required by the system is below of a required volume, while the fluid pressure of the fluid supplied to the actuator is maintained constant. Blocking of the return channel by the piston prevents leakage from the pressure side into the return channel.

In accordance with a further development of the invention, the piston, in its return channel overlapping region, has a cavity which is connected with a pressure annular space connected by a conduit with the actuator. The cavity advantageously is provided with a through opening through which an extension of the throttle projects. The direct connection of the throttle with the piston permits to obtain a flow control valve the length of which is substantially reduced and which, thus, requires a reduced mounting space in the pump.

In accordance with a further development of the invention, the pressure annular space communicates with a spring cavity, which communicates with a pressure-limiting valve that can be advantageously located outside of the piston and, thus, outside the axial extension of the inner space of the flow control valve. This insures that no second connection of the piston with the reservoir is required, and the absence of the second connection further reduces leakage losses. Further, with this arrangement, it is possible to adjust the pressure-limiting valve independently from the piston.

In one of the preferred embodiments of the invention, the discharge throttle comprises a part which is axially displaceable against a biasing force of a spring. The part is displaceable on a sleeve which overlaps the discharge throttle and the piston cavity and is fixedly mounted. The sleeve has an axial cavity which is connected with a pressure space inside the discharge throttle and with the interior of the piston by axially offset relative to each other orifices. Providing the discharge throttle with a displaceable part permits to provide a discharge throttle, which is adjustable in accordance with a dynamic pressure of the pressure flow and, thus, enables the adjustment of the fluid flow to the actuator independently of the system pressure.

According to another preferred embodiment of the invention, the piston has a conical end region the outer surface of which forms, together with an edge of an annular valve seat, a seated valve which prevents leakage.

In yet another preferred embodiment of the invention, the piston has a conical end region the outer surface of which forms with an edge of an annular valve seat a seated valve arrangement. The conical outer surface can be rather easily obtained during manufacturing of the piston because the piston is a rotationally symmetrical part. According to a more preferred variant of this embodiment, the annular valve seat is formed as an extension of a plug which closes the housing bore and forms a discharge throttle. Here, the valve seat is an integral part of the plug which can be secured in the housing bore by being screwed thereinto.

In another variant of this embodiment, an inner surface of the annular valve seat and the outer surface of the conical end portion of the piston form an annular space. The inner surface of the annular valve seat and the outer surface of the conical end portion of the piston can extend parallel to each other or at an angle to each other. By selecting the arrangement of the inner surface of the annular valve seat relative to the outer conical surface of the piston, it is achieved that, upon opening of the seated valve arrangement, the cross-section of the flow opening can be changed. The changing of the flow opening cross-section permits to further vary the flow characteristics of the valve assembly, in addition to varying them in accordance with the path-dependent adjustment of the discharge throttle.

By varying the diameter of either or both of the inner surface of the seat and the outer surface of the conical end portion of the piston, a variable cross-section of the annular space therebetween in an axial direction can be obtained. This permits to control, in a simple and advantageous manner, in accordance with the flow characteristic of the piston, the flow angle at which the oil flows into a channel leading to the region of lower pressure.

BRIEF DESCRIPTION OF THE DRAWING

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
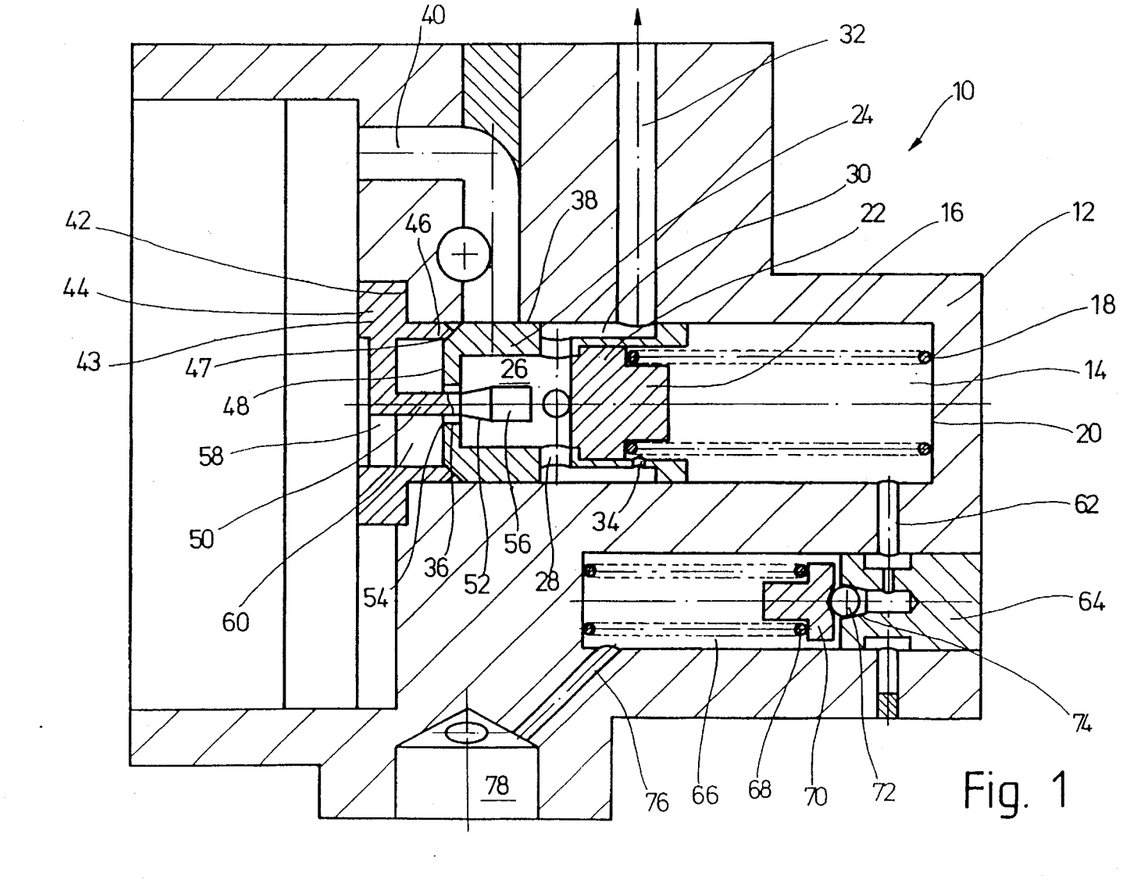
FIG. 1 is a longitudinal cross-sectional view of a first embodiment of the valve assembly according to the present invention.

FIG. 1 shows a valve assembly comprising a flow control valve 10 having an axial cavity 14, which is formed in a housing 12 of a discharge device, e.g., a steering pump. The flow control valve includes a valve piston 16 which is displaceable in the cavity 14 against a biasing force of a spring 18. The spring 18 has its opposite ends supported on the bottom 20 of the cavity 14 and a shoulder 22 of the valve piston. The piston 16 has an end portion 24 having a cavity 26. A passage 28 communicates the cavity 26 with a pressure annular space 30. A channel 32 communicates the annular space 30 with an actuator. Another passage 34, formed in the piston 16, communicates the annular space 30 with the spring cavity 14. The end region 24 of the piston 16 further includes an axial opening 36. The outer surface 38 of the end region 24 covers a channel 40, which is formed in the housing 12 and leads to a suction region of a pump (not shown). At an end of the cavity 14, which is subjected to the pressure of the discharge fluid, there is provided a valve seat 42 in which a throttle holder 43 for a discharge throttle 44 is located. The throttle 44 has a ring portion 46 which abuts an end surface 48 of the end portion 24. The ring portion 46 of the discharge throttle 44 and the end portion 24 of the piston 16 define together a seated valve 47. The ring portion 46 and the end surface 48 both have abutting bevels which define an entrance into the channel 40. The bevel of the end portion 24 of the piston 16, which is provided at an axial end of the outer surface 38 of the end of the outer surface 38 of the end region 24, is aligned with the inner surface of the wall of the channel 40, so that the outer surface 38 sealingly overlaps the channel 40, and in a closed position of the seated valve 47, the throttle cavity 60 is sealingly separated from the channel 40. The discharge throttle 44 has an axial extension 50 which projects through the opening 36 of the end portion 24 into the cavity 26 and is provided with a conical widening region 52 located in the cavity 26. The maximal diameter of the extension 50 is smaller than the diameter of the opening 36.

The surface of the opening 36 and the outer surface of the extension 50 defines an annular gap 54, which provides for the adjustment of the throttle 44. The extension 50 has an end region 56 the diameter of which exceeds that of the opening 36. The discharge throttle 44 is further provided with radially extending spokes 58 which separate the throttle cavity 60 from the pump pressure side. The spokes 58 serve for supporting the extension 50. The cavity 60 is limited by the end surface 48 of the end region 24 of the piston 16. A channel 62 connects the axial cavity 14 with a pressure-limiting valve 64 arranged in the cavity 66 of the housing 12. The pressure-limiting valve 64 comprises a support member 70 which presses a closing member 72 against a mouth of a channel 74. The cavity 66 is connected by a channel 78 with an inlet of the reservoir of the discharge device.

The valve assembly shown in FIG. 1 operates as follows. Upon actuation of the discharge device (not shown), a predetermined oil pressure establishes in the cavity 60 and is transmitted through the annular gap 54 into the cavity 26 whereby a predetermined pressure is established in the cavity 26. The pressure in the cavity 26 is determined by the width of the annular gap 54, which acts as a restriction. The fluid flows from the cavity 26 through the passage 28 into the annular space 30 and, therefrom, through the channel 32 to the actuator.

If the fluid pressure in the cavity 60 exceeds a predetermined magnitude, e.g., when the rotational speed of the pump exceeds 1000 revolution/min., or when a predetermined fluid pressure is achieved, the seated valve 47 opens due to movement of the piston 16, under the pressure action on the end surface 48 of the end portion 24 of the piston, to the right against the biasing force of the spring 18. Due to the rightward axial displacement of the piston 16, a gap between the ring shoulder 46 and the end surface 48 is created providing a flow passage that connects the pressure cavity 60 with the return channel 40. Due to fluid flow into the channel 40, the fluid pressure in the pressure cavity 60 is reduced. Further, due to the rightward axial displacement of the piston 16, the opening 36 is displaced toward the widening portion of the conical portion 52 of the throttle extension 50. As a result, the width of the annular gap 54 is reduced which leads to a reduced fluid flow through the channel 32.

During the idle running of the pump, the pressure in the cavity 60 is insufficient to displace the piston 16 against the biasing force of the spring 18, and the throttle is in its maximum open position. That is the width of the annular gap 54 is at its maximum, and a constant fluid flow is directed to the actuator because the seated valve 47 reliably seals the channel 40 from the pressure cavity 60, no leakage therethrough takes place, and the flow characteristics of the valve assembly are not adversely affected by leakage losses.

The fluid pressure in the annular pressure space 30 is communicated, through the passage 34, to the spring cavity and therefrom, through the channel 62, to the pressure-limiting valve 64. When the system pressure exceeds a predetermined magnitude, this pressure, which is communicated to the pressure-limiting valve 64, acts on the closing member 72 which, together with its support member 20, are displaced against the biasing force of the spring 68. This results in fluid flow into the cavity 66 and therefrom, through the channel 76, to the inlet 78 of the reservoir. This prevents a further rise in fluid pressure and further insures maintaining of the maximal desired pressure.

Figure 2:
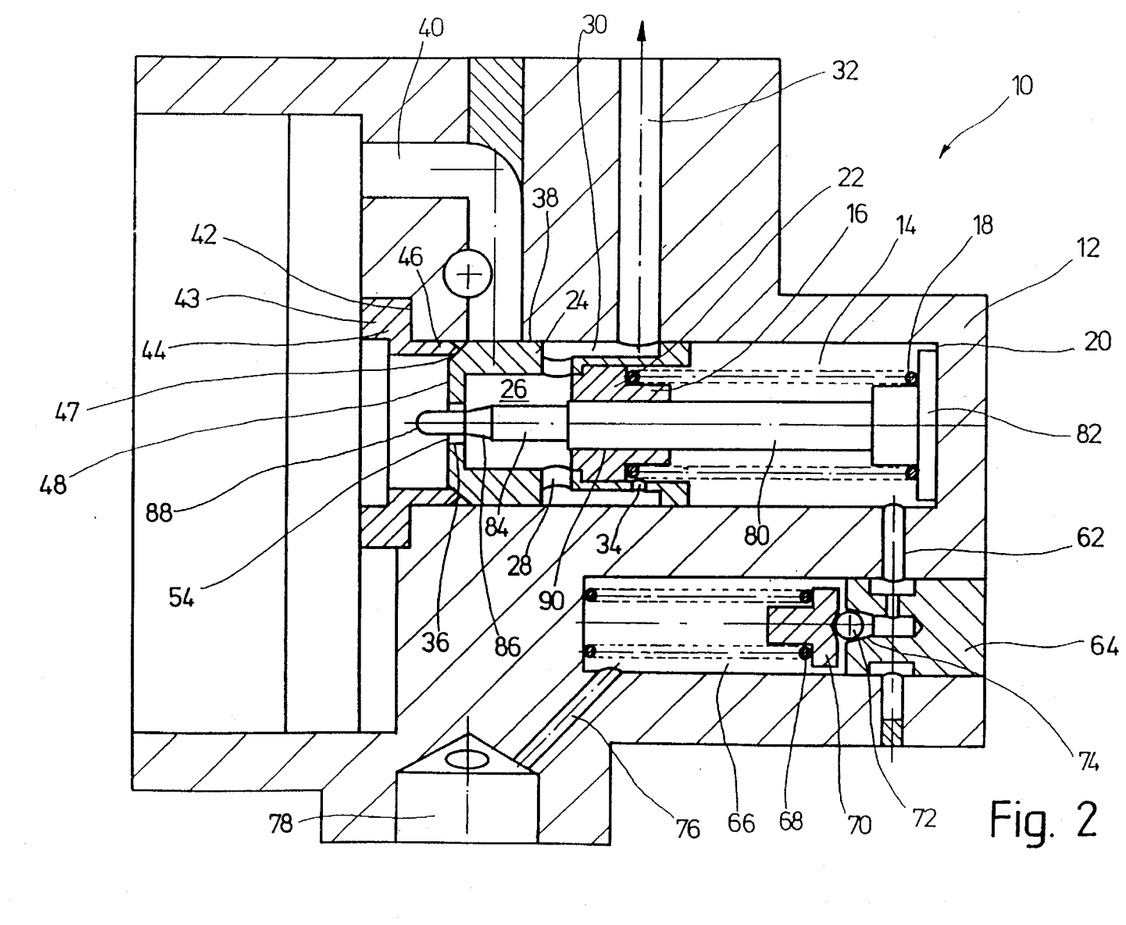
FIG. 2 is a longitudinal cross-sectional view of a second embodiment of the valve assembly according to the present invention.

FIG. 2 shows another embodiment of the valve assembly according to the present invention in which the elements, identical to those shown in FIG. 1, are designated with the same reference numerals. In the embodiment of the valve assembly, shown in FIG. 2, the valve piston 16 has a core 80 which is secured to the bottom 20 of the cavity 14 with a collar 82. The spring 18 is supported at its opposite ends, respectively on the collar 82 and the shoulder 22. Inside the cavity 26, the core 82 is provided with an extension 84 of a smaller diameter. The extension 84 has a tapering portion 86, which tapers toward the opening 36, and an end portion 88 extending through the opening 36. The diameter of the end portion 88 is smaller than that of the opening 36 whereby an annular gap 54 is provided. The piston 16 has an opening 90 through which the core 80 extends. The piston is slidably displaceable along the core 80.

The valve assembly shown in FIG. 2 functions in the same manner as that shown in FIG. 1. With the reduction in flow volume, an increased pressure acts on the end surface 48 and causes the displacement of the piston 16 against the biasing force of the spring 18 and thereby the displacement of the opening 36 toward the widening portion of the tapering portion 86 of the extension 84 of the core 80. This results in the reduction of the width of the annular gap 54. After that, the valve assembly function in the same manner as discussed with regard to the valve assembly of FIG. 1.

Figure 3:
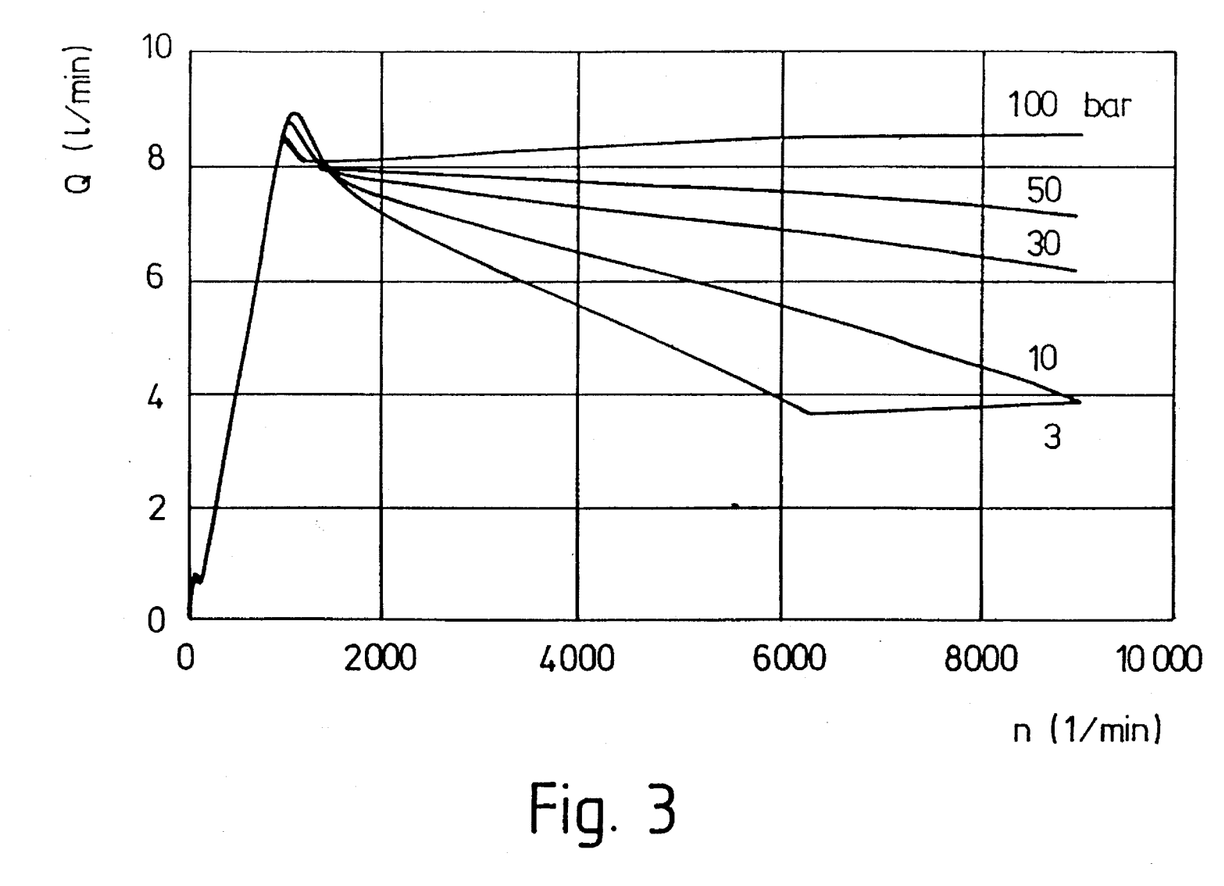
FIG. 3 is a diagram showing static characteristics of the valve assembly of FIGS. 1 and 2.

FIG. 3 shows a diagram which represents static characteristics of the valve assembly shown in FIGS. 1 and 2. The characteristics represent the dependence of a flow volume in 1/min from a pump rotational speed in revolution/min. The characteristics show that at an increased speed, when travelling on a highway, and a reduced pressure, the volume flow is also reduced. At the high pressure, e.g., with a flattened tire, when a high degree of power assist is required, the volume flow is not reduced. With the use of a discharge throttle, with a path-dependent adjustment, the volume flow always depends on system pressure.

Figure 4:
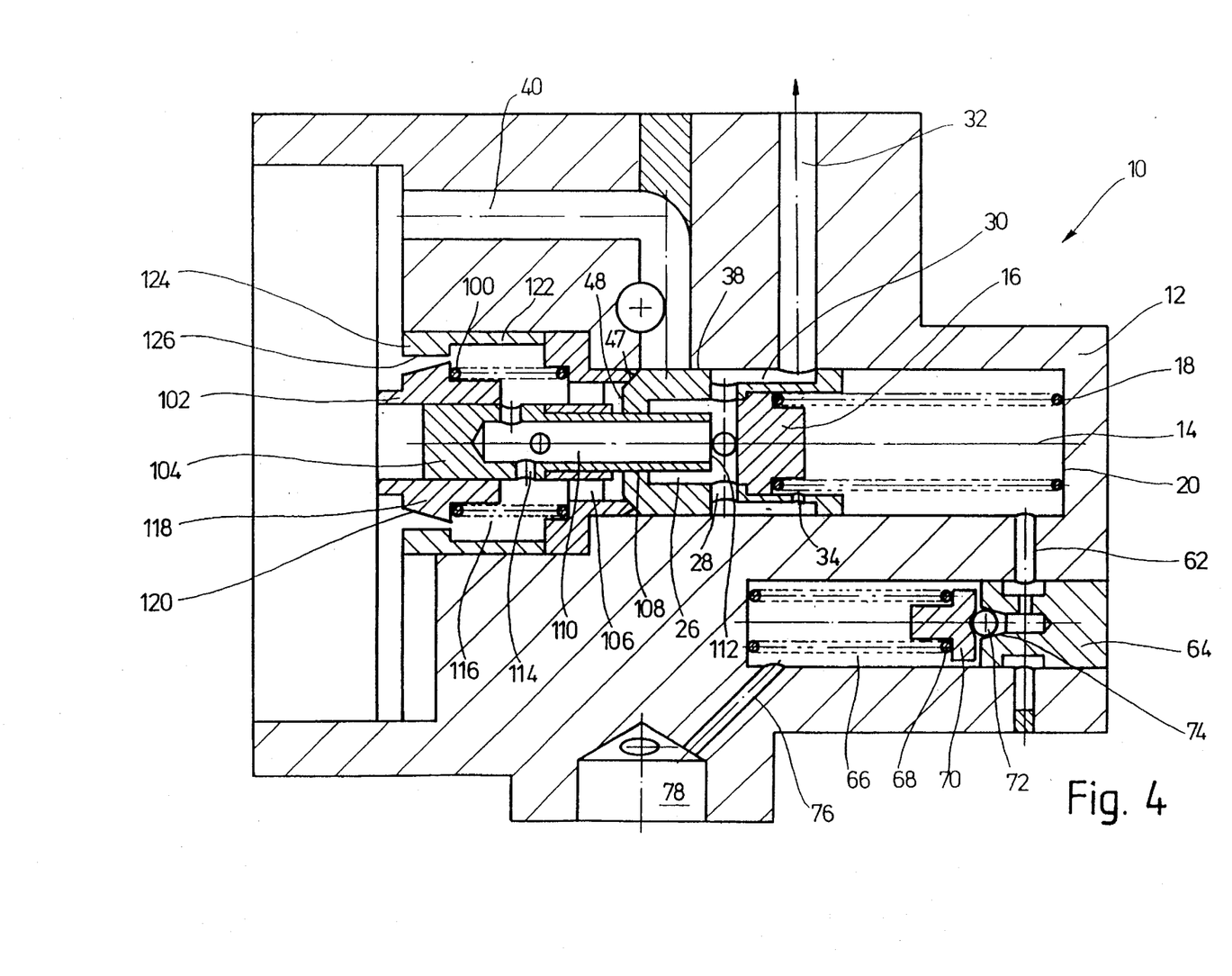
FIG. 4 is a longitudinal cross-sectional view of a third embodiment of the valve assembly according to the present invention.

FIG. 4 shows a third embodiment of the valve assembly according to the present invention. Here, also the elements, identical to those of FIGS. 1 and 2, are designated with the same reference numerals. In this embodiment, the discharge throttle 44 has a displaceable part 102 which is displaceable against a biasing force of a spring 100.

The part 102 is displaceable along a sleeve 104 which is fixed in the housing cavity 14 by a spoke wheel 106. The sleeve 104 extends into the cavity 26 of the end portion 24 of the piston 16 through an opening 108. The sleeve 104 has an inner axial cavity 110 which communicates with the cavity 26 through an end opening 112. The sleeve 104 has a plurality of axially offset relative to each other openings 114 which communicate the cavity 110 with a pressure space 116 communicating with a pump pressure side. The displaceable part 102 has an annular shoulder 118 which acts as a support for one end of the spring 100. The displaceable part further has a conical annular surface 120. Another spring 122, which is provided with a collar 124, is also fixedly secured in the housing 12. The collar 124 has a surface 126, which extends parallel to the housing axis and is located opposite the conical surface 120 of the displaceable part 102.

The valve assembly of FIG. 4 functions as follows. The pressure fluid, delivered from the pump, acts on the part 102 and displaces it against the biasing force of the spring 100, when fluid pressure exceeds a predetermined magnitude, the width of the annular gap between the surfaces 126 and 120, which provides for the flow of pressure fluid into the pressure space 116, increases. Upon its displacement, the part 102 covers, one after another, the openings 114 and thereby reduces the flow inlet area leading to the inner cavity 110 of the sleeve 104. The reduction of the flow inlet area into the inner cavity 110 due to displacement of the part 102 results in the reduction of volume flow to the actuator, that is in reduction of the power assist steering. Due to increase of the width of the gap between the surfaces 126 and 120, pressure in the cavity 116 increases. This increased pressure acts on the end surface 48 of the piston 16 and causes the displacement of the piston against the biasing force of the spring 18, as it is described with reference to FIGS. 1 and 2. The displacement of the piston 16 leads to unseating of the seated valve 47 and provides for fluid flow into the channel 40. Further, the functioning of the valve assembly of FIG. 4 is the same as of the valve assembly of FIGS. 1 and 2.

Figure 5:
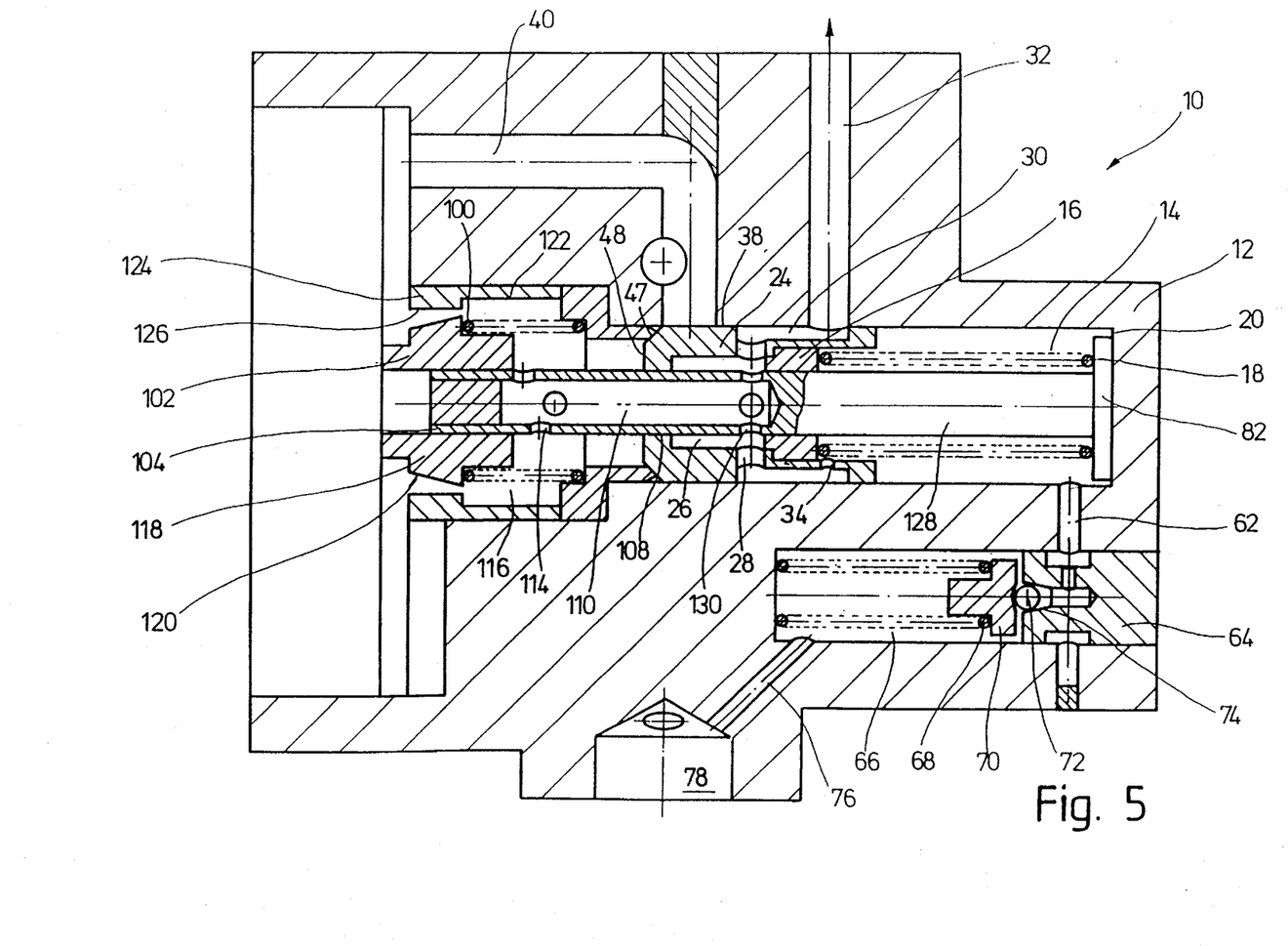
FIG. 5 is a longitudinal cross-sectional view of a fourth embodiment of the valve assembly according to the present invention.

FIG. 5 shows another embodiment of the valve assembly according to the present invention, which represents a modification of the valve assembly shown in FIG. 4 and in which identical elements are designated with the same reference numerals. In this embodiment, the sleeve 104 forms with a core 128, extending through the piston 16, a single part, along which both the part 102 of the throttle and the piston 16 are displaceable against, respectively, the biasing force of the spring 100 and the spring 18. The inner cavity 110 of the sleeve 104 is provided with openings 130 which communicate the fluid flow from the cavity 110 to the pressure space 130, from which fluid flows into the channel 32. The operation of the valve assembly of FIG. 5 should be clear from the description of the operation of the valve assembly of FIGS. 1, 2 and 4.

Figure 6:
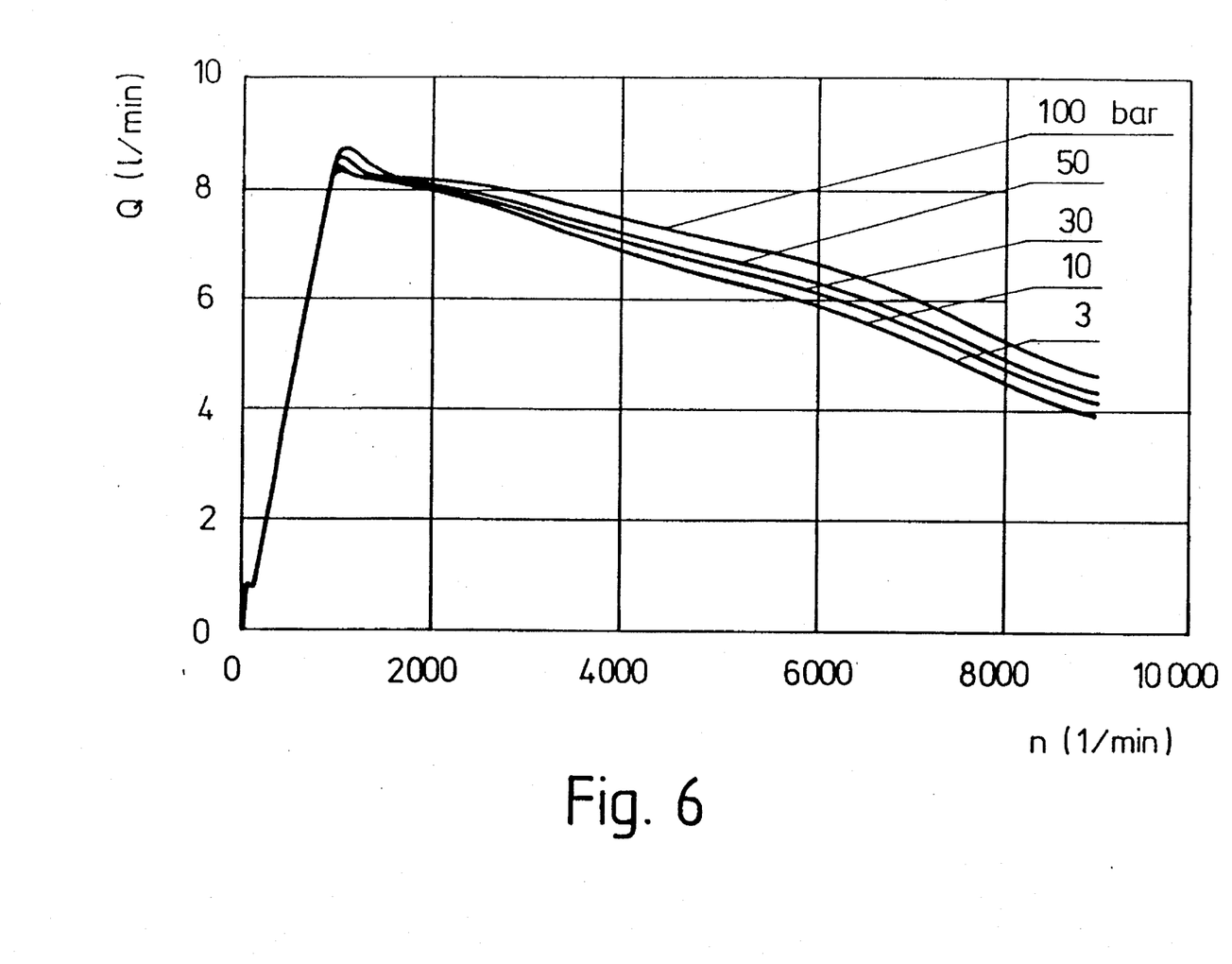
FIG. 6 is a diagram showing static characteristics of the valve assembly in FIGS. 4 and 5.

FIG. 6 shows a diagram representing the static characteristics of the valve assembly of FIGS. 4 and 5. The characteristics shown that in valve assembly of FIGS. 4 and 5, unlike the valve assembly of FIGS. 1 and 2, the characteristics of which are shown in FIG. 3, the volume flow does not depend on system pressure, but only on the pump pressure, that is on the dynamic pressure. Thus, a sudden change in the system pressure has only a limited effect on the volume flow.

As shown in FIGS. 1–6, it is possible to provide, in the axial inner cavity of a valve assembly which receives the valve piston, alternatively an integrated path-dependent or dynamic pressure-dependent discharge throttle. Because, the pressure-limiting valve is located outside the valve piston, a reliable operation of the pressure-limiting valve at high oil temperatures is achieved.

By providing a seated valve 47, leakage from a pressure side to the return or booster channel 42 past the end portion 24 of the piston 16, which functions as a slide valve, is prevented. Thus, the known drawbacks of slide valves are eliminated. In the described embodiments of the valve assembly, in effect, only a minimal leakage is possible. By an appropriate design of the elements of the valve assemblies, described above, it can be achieved that flow characteristics can be adjusted independently of the pump speed.

Figure 7:
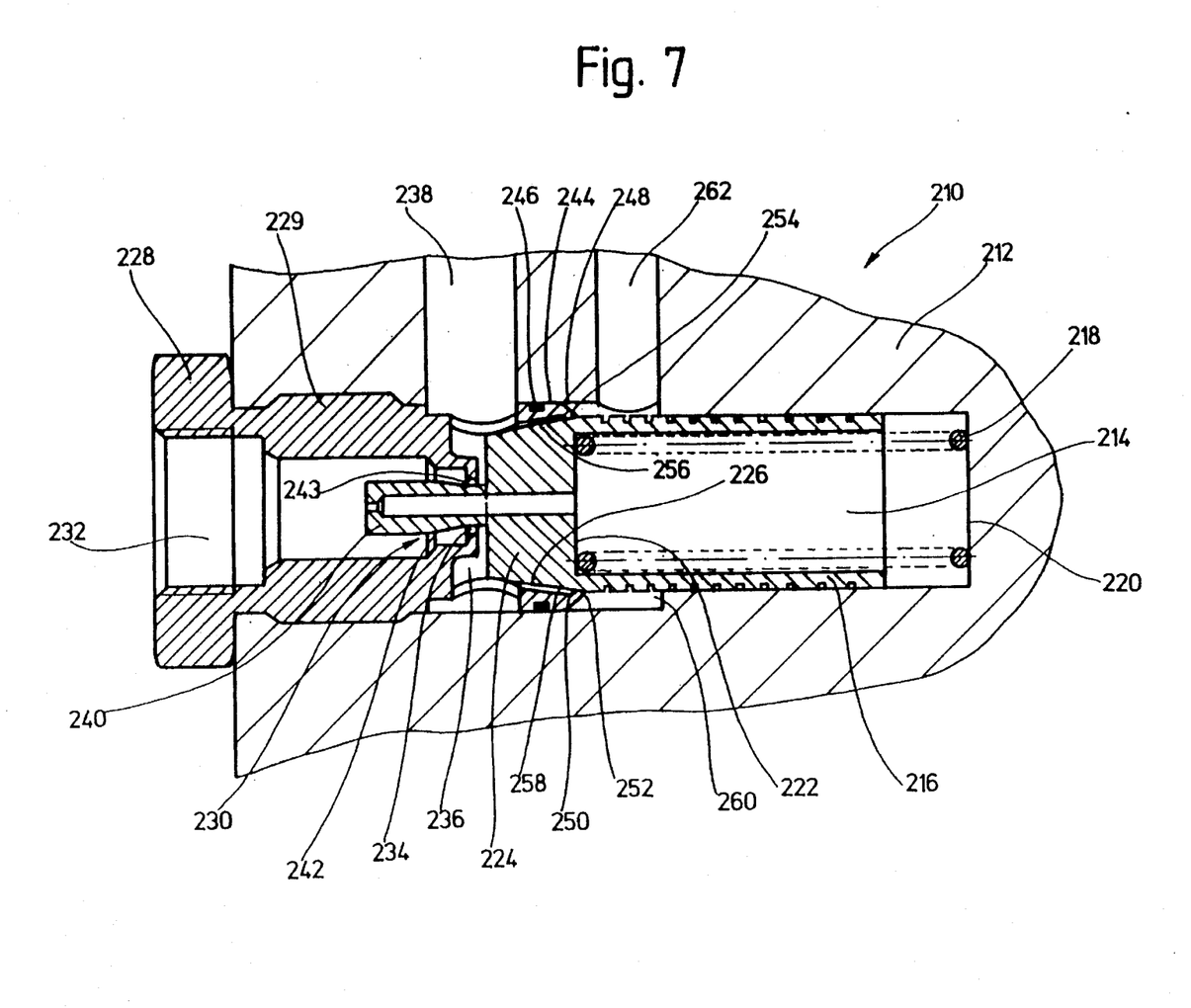
FIG. 7 is a longitudinal cross-sectional view of a fifth embodiment of the valve assembly according to the present invention.

FIG. 7 shows a further embodiment of a valve assembly according to the present invention. In FIG. 7, the flow control valve 210 is located in the axial cavity 214 of the housing 212. The flow control valve 210 comprises a piston 216, which is biased to its closed position by a spring 118, which is supported between the bottom 20 of the axial cavity 214 and a surface 122 of the piston 216. The piston 216 has a conical end region 224, the conical surface 226 of which has a diameter increasing toward the rear of the piston 216. The cavity 214 is closed from the left with a plug 228, which is secured in the cavity 214 with a thread 229. The plug 228 is connected with a hydraulic actuator (not shown), e.g., a steering gear of a motor vehicle.

The interior 132 of the plug 228 communicates through an opening 234 with an annular space 236 of the cavity 214. A first channel 238 communicates the annular space 236 with a discharge side of the discharge device (not shown), e.g., a steering pump. An extension 240 of the piston 216 projects through the opening 234. The portion of the extension 240, which is located in the interior 32 of the plug 228, has a conical portion the diameter of which increases toward the free end of the extension 240. The maximum diameter of the portion of the extension 240 is less than the diameter of the opening 234, whereby an annular gap 243 is provided. The annular gap 243 forms a metering orifice of a discharge throttle 230. The plug 228 further comprises an axial extension which forms a annular valve seat 244 which overlaps the portion 224 of the piston 216. The valve seat 244 is sealed against the inner wall 248 of the cavity 214 by a seal 246. The valve seat 244 is provided with an inner annular shoulder 250 the edge 252 of which engages the outer surface 226 of the piston 116. The edge 252 and the surface 226 form together a seated valve 254. An annular space 258 is provided between the outer surface 226 and an inner surface 256 of the valve seat 244. In the embodiment shown in FIG. 7, the surfaces 256 and 226 extend parallel to each other.

Figure 8:
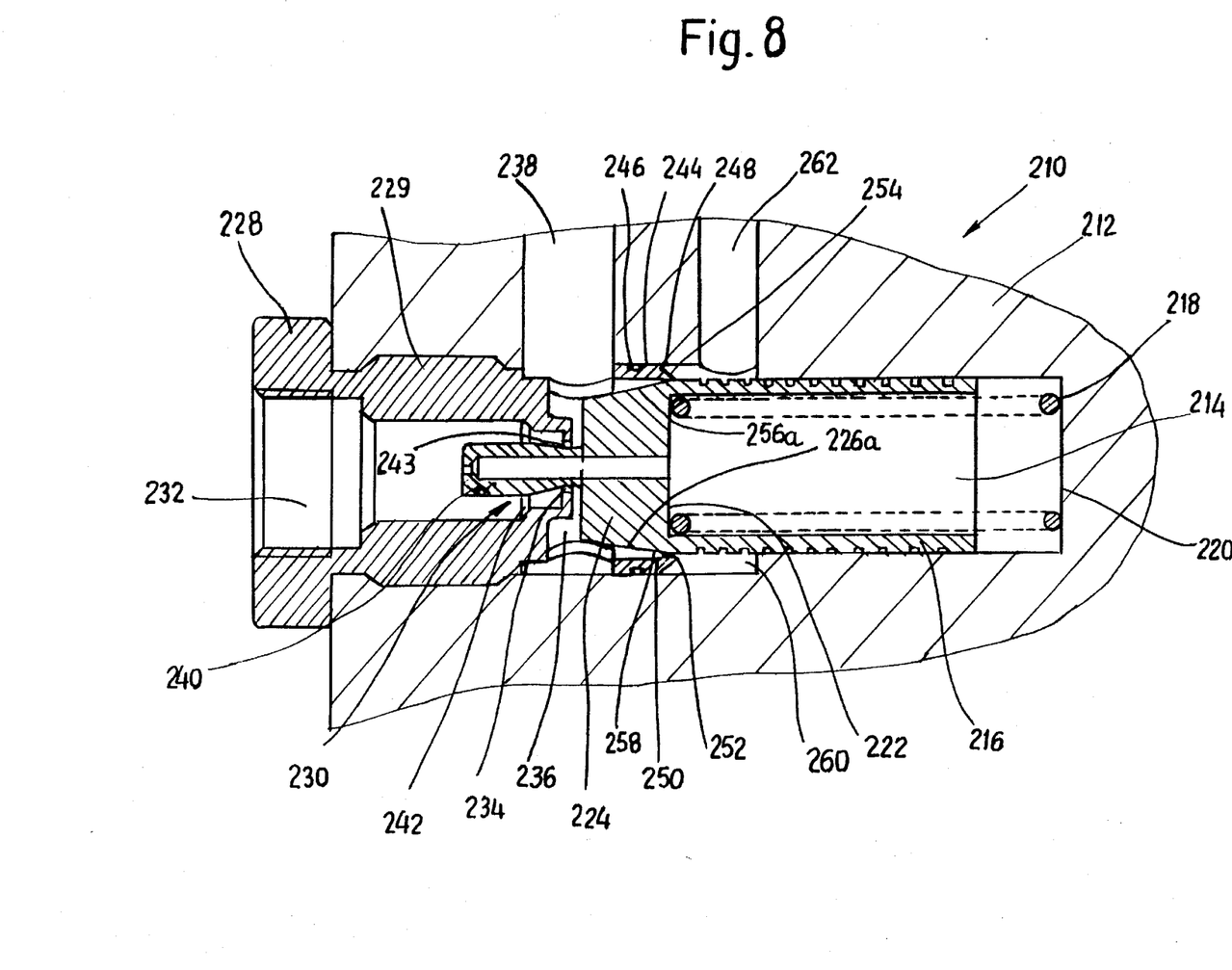
FIG. 8 is a cross-sectional view of a sixth embodiment of the valve assembly according to the present invention.

The embodiment of FIG. 8 is substantially identical to that of FIG. 7, the only difference being that the surfaces 226a and 256a, corresponding to surfaces 226 and 256 in FIG. 7, extend at an angle to each other.

A second channel 262 communicates the pressure space 260 with a low pressure region, e.g., a reservoir of a steering pump.

The valve assembly shown in FIG. 7 operates as follows:

Upon actuation of the discharge device, a predetermined pressure oil pressure is generated in the annular space 236. The pressure in the interior 232 of the plug 228 is determined by the size of the metering orifice 243. The pressure difference between the pressure in the annular space 236 and the pressure in the interior 232 acts on the piston 216 and causes its displacement against the biasing force of the spring 218. The displacement of the piston 216 results in opening of the channel 262. The size of the open area of the mouth of the channel 262 increases with an increased displacement of the piston 216 against the biasing force of the spring 218. With the displacement of the piston 216, a gap is created between the edge 252 of the valve seat 244 and the surface 226, so that the seated valves 254 opens. By making the seating surface 226 conical, a path-dependent linear characteristic of the volume flow is provided. By changing the conically of the surface 226, different linear characteristics from the same magnitude of the displacement of the piston 216 can be obtained. A corresponding selection of the inner surface 256 of the valve seat 244 permits to influence the flow force, that is, it can be reduced. Thus, in a simple manner, different linear discharge characteristics, which are independent from the speed of the discharge device, can be obtained. These characteristics can further be influenced by an appropriate selection of the discharge throttle 230.

The valve assembly of FIG. 7 permits further to reduce the leakage during the idle running of the pump. The throttle 230 permits to maintain a constant reduced volume flow, without practically any leakage.

While the present invention was shown and described with reference to the preferred embodiments, various modifications thereof will be apparent to those skilled in the art, and it is not intended that the invention be limited to the disclosed embodiments or details thereof, and departures may be made therefrom within the spirit and scope of the appended claims.

What is claimed is:

1. A valve assembly for controlling a volume flow to hydraulic actuator from a hydraulic discharge device including a housing and a return channel formed in the housing for returning an excess fluid volume to a suction side of the discharge device, said valve assembly comprising:

a discharge throttle; and a flow control valve for controlling fluid flow through said discharge throttle, said flow control valve including:

a valve piston displaceable in a first bore, which is formed in the discharge device housing and intersects the return channel, between a first position, in which the fluid flow through said discharge throttle is at its maximum, and a second position, in which the fluid flow through said discharge throttle is reduced, said valve piston having an end portion, which completely overlaps the return channel in the first position of said piston and which has an end region defining at least partially a seated valve substantially eliminating leakage of pressure fluid past said end portion into the return channel;

spring means for biasing said piston to the first position thereof; and an annular valve seat forming, with said end region, said seated valve and having a sealing edge, and wherein said end region is conical and has an outer surface engageable by said sealing edge, said annular valve seat having an inner surface defining together with said outer surface an annular space, and said inner surface and said outer surface extending parallel to each other.

2. A valve assembly for controlling a volume flow to hydraulic actuator from a hydraulic discharge device including a housing and a return channel formed in the housing for returning an excess fluid volume to a suction side of the discharge device, said valve assembly comprising:

a discharge throttle; and a flow control valve for controlling fluid flow through said discharge throttle, said flow control valve including:

a valve piston displaceable in a first bore, which is formed in the discharge device housing and intersects the return channel, between a first position, in which the fluid flow through said discharge throttle is at its maximum, and a second position, in which the fluid flow through said discharge throttle is reduced, said valve piston having an end portion, which completely overlaps the return channel in the first position of said piston and which has an end region defining at least partially a seated valve substantially eliminating leakage of pressure fluid past said end portion into the return channel;

spring means for biasing said piston to the first position thereof; and an annular valve seat forming together with said end region, said seated valve and having a sealing edge, and wherein said end region has a conical outer surface engageable by said sealing edge.

3. A valve assembly as set forth in claim 2, further comprising a pressure annular space from which fluid flows to the actuator, and wherein said end portion of said piston has a cavity and opening means for communicating said cavity with said pressure annular space.

4. A valve assembly as set forth in claim 3, wherein said end portion of said piston has an axial through opening, and wherein said discharge throttle is located in the first bore and has an axial extension projecting through said axial opening.

5. A valve assembly as set forth in claim 4, wherein said axial extension has a conical enlargement located in said cavity of said end portion.

6. A valve assembly as set forth in claim 3, wherein said discharge throttle has an inner cavity and a passage communicating said inner cavity with a pressure side of the discharge device, and wherein said piston has an end surface axially limiting said inner cavity of said discharge throttle.

7. A valve assembly as set forth in claim 3, wherein the discharge device housing has a second bore and a channel communicating the first and second bore, wherein said valve assembly further comprises a pressure-limiting valve located in the second bore, and wherein said pressure annular space has an opening for communicating said pressure annular space with the first bore, whereby system pressure is transmitted to said pressure-limiting valve through the channel communicating the first and second bores.

8. A valve assembly as set forth in claim 3, wherein said valve assembly comprises a stationary sleeve communicating with said cavity, and wherein said discharge throttle comprises a movable part displaceable over said sleeve between a first position, in which the volume flow into said cavity is at its maximum, and a second position, in which the volume flow into said cavity is reduced; and spring means for biasing said displaceable part to the first position thereof.

9. A valve assembly set forth in claim 8, wherein said sleeve includes an inner space and at least one opening for communicating said inner space with said pressure annular space whereby the pressure fluid is conducted from said pressure annular space into said inner space and therefrom into said cavity.

10. A valve assembly as set forth in claim 8, wherein said valve assembly comprises a second stationary sleeve circumscribing at least partially said displaceable part and having an annular surface, a center of which lies on an axis of said first bore, said displaceable part having a conical surface arranged opposite said annular surface of said second sleeve.

11. A valve assembly as set forth in claim 8, wherein said first sleeve extends through said piston, is supported on a bottom of said first bore, and has at least one opening communicating an inner space of said sleeve with said cavity of said end portion of said piston.

12. A valve assembly as set forth in claim 11, wherein said piston is displaceable along said sleeve.

13. A valve assembly as set forth in claim 2, wherein said end portion has a cavity and an axial opening for communicating said cavity with a pressure side of the discharge device, and wherein said piston further has a stationary core having an extension projecting through said cavity and said axial opening.

14. A valve assembly as set forth in claim 13, wherein said core extension has a conical portion tapering toward said axial opening.

15. A valve assembly as set forth in claim 2, wherein the first bore is open at least at one end thereof, wherein said discharge throttle is a part of a plug for closing the one end of the first bore, and wherein said plug has an extension defining said annular valve seat.

16. A valve assembly as set forth in claim 2, wherein said annular valve seat has an annular shoulder defining said sealing edge.

17. A valve assembly as set forth in claim 2, wherein said annular valve seat has a inner surface defining together with said outer surface an annular space.

18. A valve assembly a set forth in claim 17, wherein said inner surface and said outer surface extend at an angle to each other.

19. A valve assembly as set forth in claim 17, wherein said annular space has a variable cross-section in an axial direction.

20. A valve assembly as set forth in claim 19, wherein the variable cross-section of said annular space is formed by a varying diameter of said inner surface.

21. A valve assembly as set forth in claim 19, wherein the variable cross-section of said annular space is formed by a varying diameter of said outer surface.

* * * * *